(12) United States Patent
Hu et al.

(10) Patent No.: US 10,970,625 B2
(45) Date of Patent: Apr. 6, 2021

(54) DEVICE WITH MULTIPLE RESISTANCE SWITCHES WITH DIFFERENT SWITCHING CHARACTERISTICS

(71) Applicant: HEWLETT PACKARD ENTERPRISE DEVELOPMENT LP, Houston, TX (US)

(72) Inventors: Miao Hu, Palo Alto, CA (US); Jianhua Yang, Palo Alto, CA (US); Ning Ge, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 930 days.

(21) Appl. No.: 15/500,073

(22) PCT Filed: Nov. 3, 2014

(86) PCT No.: PCT/US2014/063667
§ 371 (c)(1),
(2) Date: Jan. 30, 2017

(87) PCT Pub. No.: WO2016/072964
PCT Pub. Date: May 12, 2016

(65) Prior Publication Data
US 2017/0243109 A1    Aug. 24, 2017

(51) Int. Cl.
*G06N 3/063* (2006.01)
*G06N 3/04* (2006.01)
*G06N 3/08* (2006.01)

(52) U.S. Cl.
CPC .......... *G06N 3/0635* (2013.01); *G06N 3/049* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 2003/0112655 A1* | 6/2003 | Hosotani | B82Y 10/00 365/158 |
| 2008/0094875 A1* | 4/2008 | Ho | B82Y 10/00 365/148 |
| 2010/0220523 A1 | 9/2010 | Dharmendra et al. | |

(Continued)

FOREIGN PATENT DOCUMENTS

WO    2012006471    1/2012

OTHER PUBLICATIONS

International Searching Authority, The International Search Report and the Written Opinion, PCT/US2014/063667, dated Jul. 13, 2015, 11 Pages.

(Continued)

*Primary Examiner* — J. H. Hur
(74) *Attorney, Agent, or Firm* — Park, Vaughan, Fleming & Dowler LLP

(57) ABSTRACT

A device according to examples of the present disclosure includes a crossbar array including a cell. The cell includes a first resistance switch and a second resistance switch connected in series with the first resistance switch. The first and second resistance switches have different switching characteristics. One of the first and second resistance switches may act as a switch, while the other of the first and second resistance switches may weight the switching behavior of the one that acts as the switch.

11 Claims, 8 Drawing Sheets

(56) References Cited

U.S. PATENT DOCUMENTS

| | | | |
|---|---|---|---|
| 2010/0299296 A1* | 11/2010 | Modha | G06N 3/0635 |
| | | | 706/25 |
| 2011/0004579 A1 | 1/2011 | Snider | |
| 2011/0121359 A1 | 5/2011 | Yang et al. | |
| 2011/0140762 A1* | 6/2011 | Jiang | G11C 11/5685 |
| | | | 327/365 |
| 2011/0248381 A1* | 10/2011 | Tong | H01L 21/26586 |
| | | | 257/537 |
| 2012/0011090 A1 | 1/2012 | Tang et al. | |
| 2012/0063192 A1* | 3/2012 | Lee | G11C 13/0007 |
| | | | 365/148 |
| 2012/0113706 A1* | 5/2012 | Williams | G11C 13/0007 |
| | | | 365/148 |
| 2012/0265719 A1 | 10/2012 | Modha et al. | |
| 2012/0330872 A1 | 12/2012 | Esser et al. | |
| 2013/0103626 A1 | 4/2013 | Hunzinger et al. | |
| 2013/0311413 A1 | 11/2013 | Rose et al. | |
| 2013/0343114 A1* | 12/2013 | Carter | G11C 13/0007 |
| | | | 365/148 |
| 2014/0214738 A1 | 7/2014 | Pickett | |

OTHER PUBLICATIONS

Querlioz, D., et al., Simulation of a Memristor-based Spiking Neural Network Immune to Device Variations, May 5, 2011, 7 Pages.

\* cited by examiner

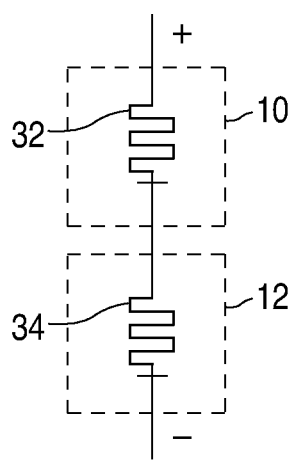 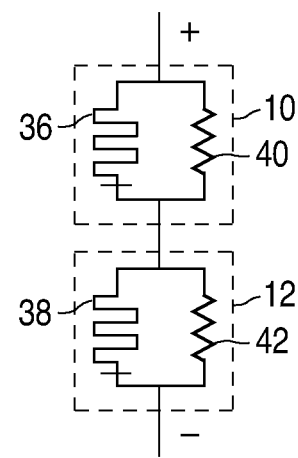
FIG. 13       FIG. 14

DEVICE WITH MULTIPLE RESISTANCE SWITCHES WITH DIFFERENT SWITCHING CHARACTERISTICS

BACKGROUND

Artificial neural networks attempt to replicate the structure and/or function of biological neural networks. Biological neural networks typically include a number of neurons which are interconnected by chemical synapses. These chemical synapses are specialized junctions through which neurons transmit signals within the biological neural network. The combination of neurons and synapses provide for biological computations that underlie perceptions, thought, and learning. As the biological neural network is exposed to an input stimulus, some of the neurons and/or synapses undergo a self-learning process using locally available information. This self learning allows the network to adapt to new stimulus while retaining a memory of previous stimulus.

Implementing an artificial neural network within a computer architecture can be challenging. The elementary components of a silicon based computer, the capacitor, resistor, inductor and transistor, do not have intrinsic memory capabilities analogous to neurons or synapses. Consequently, many existing artificial neural networks rely on complex hardware implementations or software simulations. This and other limitations have resulted in artificial neural networks which are complex, resource intensive, and have limited capabilities.

BRIEF DESCRIPTION OF THE DRAWINGS

For a detailed description of various examples, reference will now be made to the accompanying drawings in which:

FIG. 13 is a circuit diagram of a MST in a crossbar array, according to examples of the present disclosure; and FIG. 14 is a circuit diagram of a MST in a crossbar array, according to examples of the present disclosure.

NOTATION AND NOMENCLATURE

Figure 1:
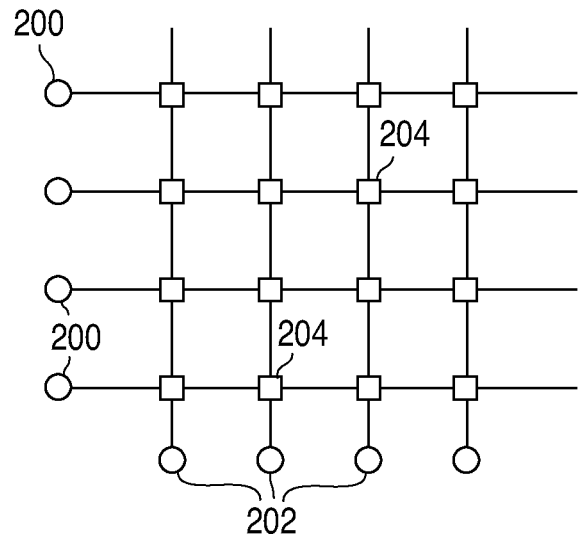
FIG. 1 is a circuit diagram of a portion of a crossbar array with cells incorporating spatial and temporal functions, according to examples of the present disclosure.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct electrical or mechanical connection, through an indirect electrical or mechanical connection via other devices and connections, through an optical electrical connection, or through a wireless electrical connection.

DETAILED DESCRIPTION

The following discussion is directed to various examples of the disclosure. Although one or more of these examples may be preferred, the examples disclosed should not be interpreted, or otherwise used, as limiting the scope of the disclosure, including the claims. In addition, one skilled in the art will understand that the following description has broad application, and the discussion of any example is meant only to be descriptive of that example, and not intended to intimate that the scope of the disclosure, including the claims, is limited to that example.

In memristive devices, the resistance of the device may be altered. The resistance of the device depends on the history of current flow through the device. This property of memristive devices may be used to mimic synaptic connections in order to construct an artificial neural network.

Some proposed artificial neural network algorithms and circuits focus on a synapse's spatial function. For example, when only the synapse's spatial function is considered, a synaptic weight representing the connection strength stays unchanged after learning is completed. However, these approaches generally omit the temporal property of a biological synapse. For example, when both the synapse's spatial and temporal functions are considered, the connection strength may be adaptively adjusted based on the relative timing of spikes (short voltage pulses that carry information between input and output neurons 200 and 202.

Examples of the present disclosure include switches or cells formed from memristive devices that may be used as part of an artificial neural network. In some examples, the switches may incorporate both spatial and temporal functions.

In some examples described below, a structure may include one or more resistance switches. Any suitable devices where the resistance may be adjusted may be used.

Examples of suitable devices that may be used as resistance switches, or that may be included in resistance switches, include magnetic random access memory (RAM) switches, phase change RAM switches, and memristive devices.

A memristive device may be a programmable resistor or "memristor." The memristor carries a memory of past electrical fields which have been applied. Memristor devices may be based on dopant motion within a matrix material, as described in U.S. Patent App. Pub. No. 2008/0079029, entitled "Multi-terminal Electrically Actuated Switch" and U.S. Patent App. Pub. No. 2008/0090337, entitled "Electrically Actuated Switch", both to R. Stanley Williams, which are incorporated herein in their entirety. Specifically, when an electrical field of sufficient magnitude is applied to a memristor, the dopants within the matrix material are displaced. When the electrical field is removed from the circuit, the displacement of the dopants allows the memristor to "remember" how much voltage was previously applied and for how long. The motion of these dopants alters the electrical resistance of the memristor. The dopants remain in this displaced state over long periods of time, thereby retaining a memory of the past electrical fields applied to the device. Until another electrical field is applied to the memristor which has sufficient intensity or duration to induce dopant motion, the resistance characteristics of the memristor are stable.

FIG. 1 illustrates a portion of a crossbar array according to examples of the present disclosure. A plurality of input neurons 200 and output neurons 202 are connected in an array through a plurality of cells 204. The cells 204 may be switches that may incorporate both spatial and temporal functions. Such cells 204 may be referred to herein as memristor-based spatio-temporal synapses, or MSTs.

An MST according to examples of the present disclosure supports both spatial and temporal weighting functions. Spatial weighting refers to modulating a signal through the cell or MST. The spatial weight is tunable and adjustable in learning process and remains unchanged in recalls. Temporal weighting refers to the relative timing of signals in both recall and learning processes. The temporal weight reflects the MST's status of ON or OFF (activated or deactivated), which is determined by correlation strength of the two neurons connected by the MST.

Figure 2:
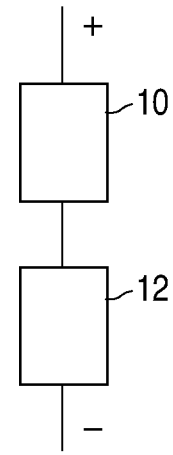
FIG. 2 is a circuit diagram of a memristor-based spatiotemporal synapse (MST) in a crossbar array, according to examples of the present disclosure.

FIG. 2 illustrates a circuit diagram of an MST according to one example of the present disclosure. The structure illustrated in FIG. 2 includes a first resistance switch 10 and a second resistance switch 12. The first and second resistance switches are connected in series. The first and second resistance switches have different switching characteristics. For example, the first and second resistance switches 10 and 12 may have different switching voltages to change their resistance, and/or have different switching voltages.

Figure 3:
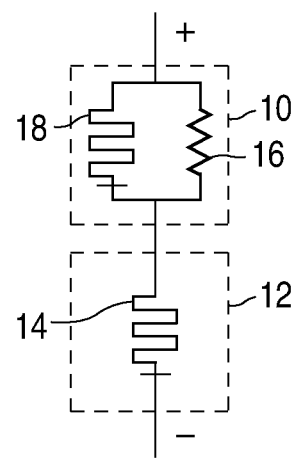
FIG. 3 is a circuit diagram of a MST in a crossbar array, according to examples of the present disclosure.

FIG. 3 illustrates an example of a circuit diagram of an MST as illustrated in FIG. 2, according to examples of the present disclosure. In the structure illustrated in FIG. 3, the first resistance switch 10 is a memristor 18 connected in parallel with a resistor 16. The second resistance switch 12 is a memristor 14. The memristors 14 and 18 may be identical devices, though they need not be.

In the MST illustrated in FIG. 3, memristor 14 realizes the temporal weighting and the conductance of memristor 18 represents the spatial weighting. When memristors 14 and 18 are identical devices, they have the same ON and OFF resistance states, ($R_{ON}$ and $R_{OFF}$) and identical switching dynamics. To protect the spatial weighting in recall, memristor 18 is connected in parallel with resistor 16 such that the majority of voltage across the MST can apply to memristor 14. The following inequality corresponding to the worst-case situation when memristors 14 and 18 are respectively at ON and OFF states shall be satisfied: $R_{ON} > (R_{OFF})(R/(R_{OFF}+R))$. When $R_{OFF} = (k)(R_{ON})$ and $R = (x)(R_{ON})$, the inequality becomes $k+x > kx$, which indicates that $x \leq 1$ is satisfied because $k > 1$. When $x=1$ and $R=R_{ON}$, by adjusting the voltage across the MST, memristor 14 can be switched alone without impacting memristor 18. The state change of memristor 18, however, is always associated with memristor 14's switching in this example.

Figure 4:
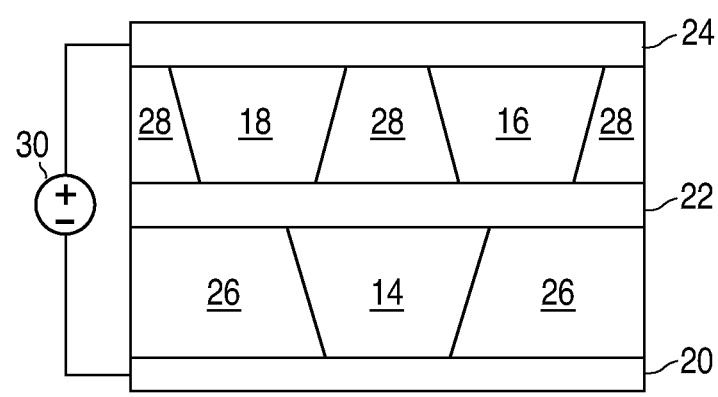
FIG. 4 is a cross sectional view of the MST illustrated in FIG. 3, according to examples of the present disclosure.

FIG. 4 is a cross sectional view of the MST illustrated in FIG. 3 in examples of the present disclosure. Top and bottom electrodes 20 and 24 are conductive layers, often metal. Any suitable material may be used such as, for example, platinum (Pt), titanium nitride (TiN), tantalum nitride (TaN), niobium nitride (NbN), hafnium nitride (HfN), zirconium nitride (ZrN), ruthenium oxide ($RuO_2$), iridium oxide ($IrO_2$), aluminum (Al), Ta, Ti, copper (Cu), cobalt (Co), nickel (Ni), Nb, molybdenum (Mo), tungsten (W), Hf, Zr, chromium (Cr) or any other suitable metal or non-metallic material. Top and bottom electrodes 20 and 24 are coupled to a power supply 30. An additional conductive layer 22 is disposed between top and bottom electrodes 20 and 24.

Between conductive layers 20 and 22, memristor 14 is formed. Memristor 14 may be formed from any suitable material including, for example, $HfO_x$, $TaO_x$ (0<x<2.5), $ZrO_x$ (0<x<2), zinc oxide ($ZnO_x$) (0<x<2), $NiO_x$ (0<x<1.5), iron oxide ($FeO_x$) (0<x<1.5), $CoO_x$ (0<x<1.5), yttrium oxide ($YO_x$) (0<x<1.5), silicon oxide ($SiO_x$) (0<x<2), $WO_x$ (0<x<3), $NbO_x$ (0<x<2.5), $TiO_x$ (0<x<2), AlOx (0<x<1.5), $MoO_x$ (0<x<3), gallium oxide ($GaO_x$) (0<x<1.5), $AlN_x$ (0<x<1.5), $GaN_x$ (0<x<1.5), $AlGaN_x$ (0<x<1.5). Memristor 14 may be formed in an insulating material layer 26, which may be any suitable material including, for example, $SiO_2$ or $Si_3N_4$.

Between conductive layers 22 and 24, memristor 18 and resistor 16 are formed. Memristor 18 may be any suitable material including, for example, an oxide of tantalum. Resistor 16 may be formed from any suitable material including, for example, polysilicon, TaAl, TaSiW compounds etc. Memristor 18 and resistor 16 may be formed in an insulating material layer 28, which may be any suitable material including, for example, $SiO_2$ or $Si_3N_4$. Memristor 18 and resistor 16 are electrically isolated from each other by insulating layer 28.

The MST of FIGS. 3 and 4 may be easily scaled to nanoscale for higher density and may be integrated into any cross-point layouts.

Figure 5:
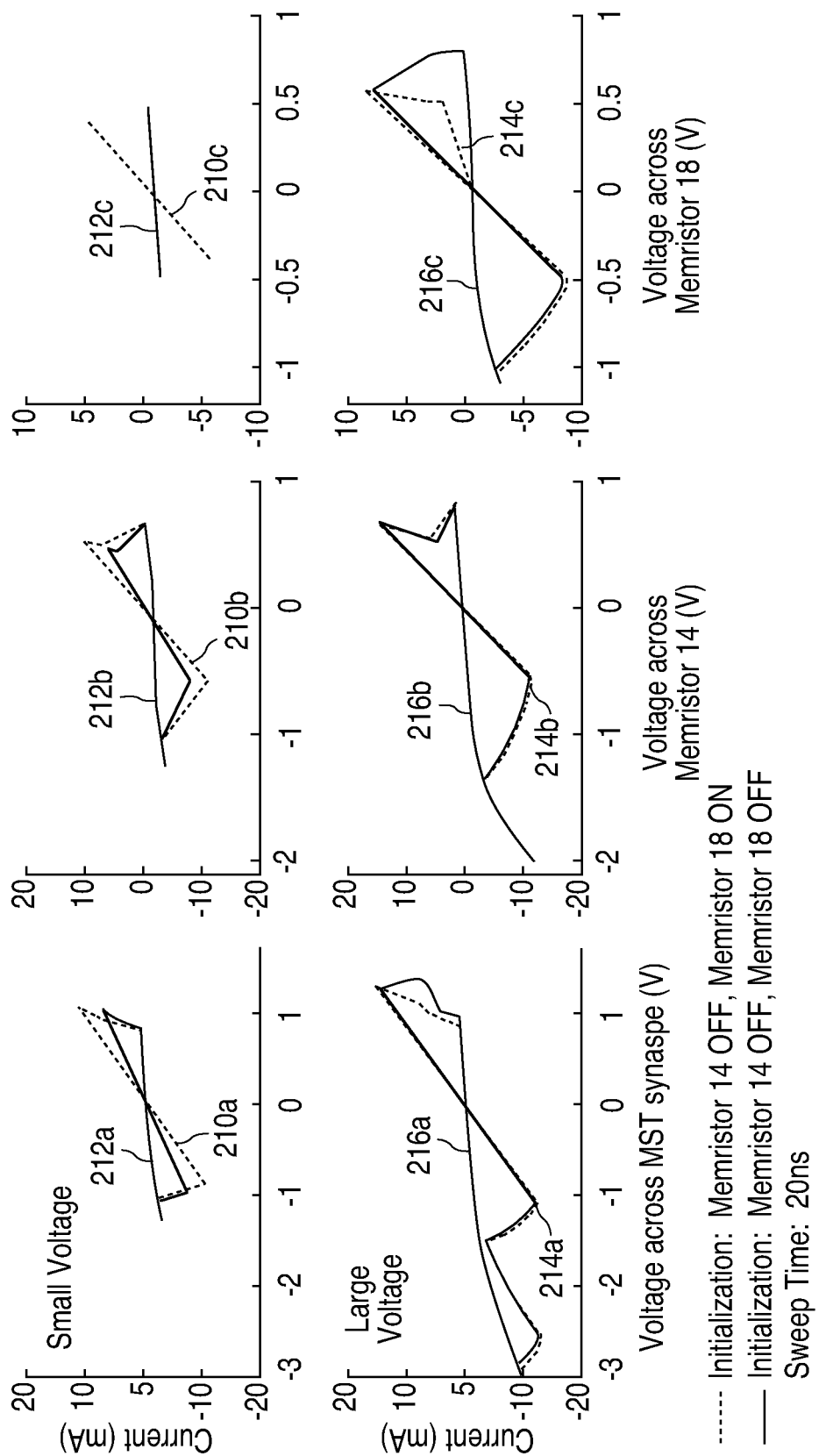
FIG. 5 illustrates current as a function of voltage through a MST illustrated in FIGS. 3 and 4 and through two memristors in the MST, at a small voltage and at a larger voltage, for two different initialization states, according to examples of the present disclosure.

FIG. 5 illustrates a simulation of the behavior of the MST illustrated in FIGS. 3 and 4, according to examples of the present disclosure. The simulation is based on a $TaO_x$ device model for memristors 14 and 18. In FIG. 5, the top row of figures illustrates the behavior of the MST at low voltage, and the bottom row of figures illustrates the behavior of the MST at higher voltage. The left-most top and bottom figures are the I-V characteristics of the entire MST. The center top and bottom figures are the I-V characteristics of memristor 14. The right-most top and bottom figures are the I-V characteristics of memristor 18.

Each of the six figures in FIG. 5 illustrates the I-V characteristics for two initialization states. I-V curves 210a, 210b, and 210c illustrate the behavior when memristor 14 turns on (at a small voltage) from an initialization state where memristor 14 is off and memristor 18 is on. I-V curves 212a, 212b, and 212c illustrate the behavior when memristor 14 turns on (at a small voltage) from an initialization state where memristor 14 is off and memristor 18 is off. I-V curves 214a, 214b, and 214c illustrate the behavior when memristor 14 turns on (at a large voltage) from an initialization state where memristor 14 is off and memristor 18 is on. I-V curves 216a, 216b, and 216c illustrate the behavior when memristor 14 turns on (at a large voltage) from an initialization state where memristor 14 is off and memristor 18 is off.

When the voltage across the MST is too small to meet the memristor's SET/RESET threshold under a given sweep time, neither memristor 14 nor 18 can change. As the voltage applied to the MST increases gradually, memristor 14 will first reach switching condition. The top three I-V curves in FIG. 5 demonstrate that the temporal component memristor 14 can be freely switched ON/OFF while the spatial component memristor 18 remains unchanged. The bottom three I-V curves in FIG. 5 imply that an even larger voltage amplitude is required to trigger the two-stage switching behavior including both memristor 14 switching and memristor 18 weight tuning. In summary, the MST exhibits the weighted switching feature under a small excitation and its weight could be programmed if the applied voltage is sufficiently large.

Figure 6:
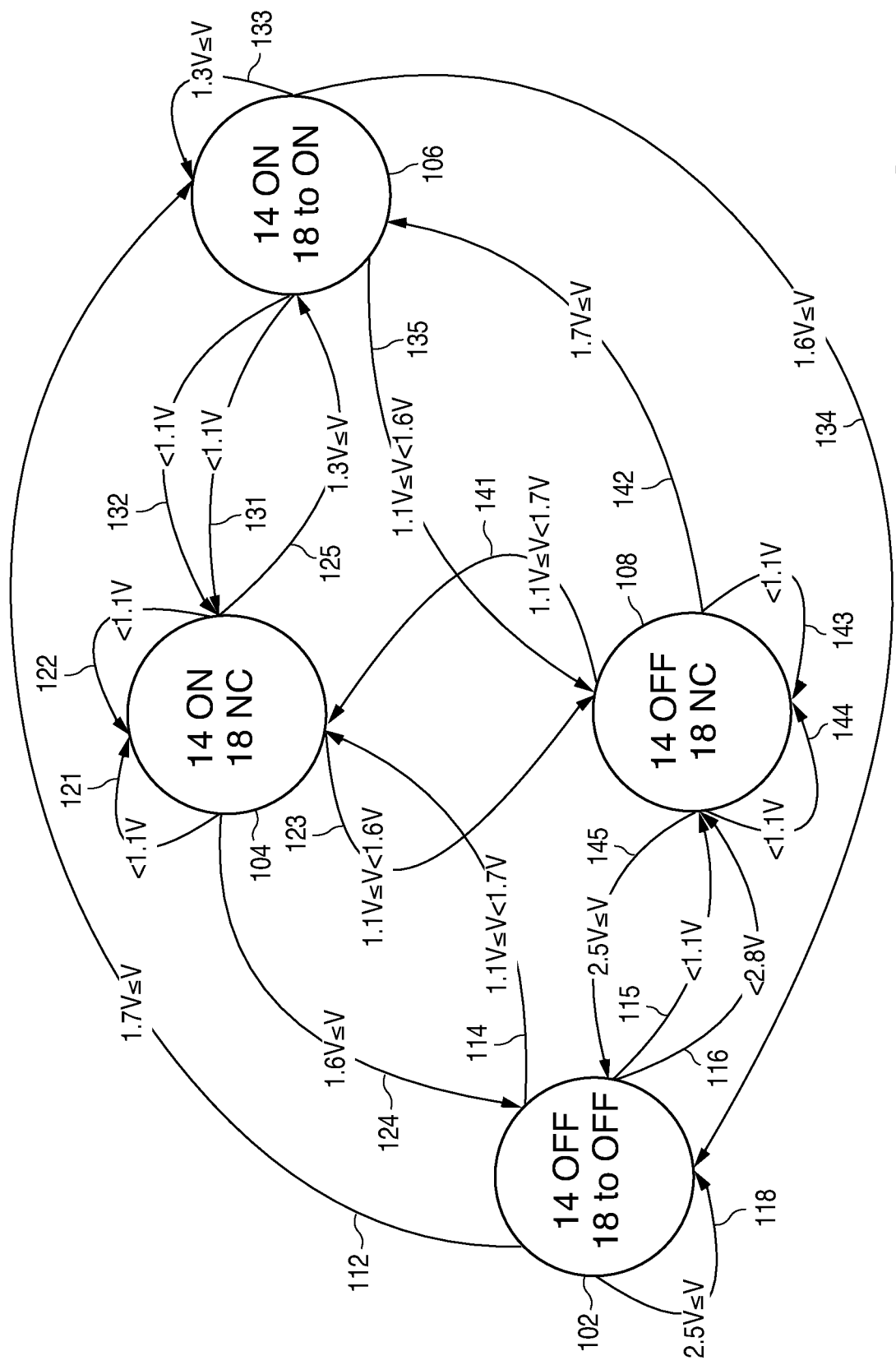
FIG. 6 is a state diagram describing the behavior of the MST of FIG. 3, according to examples of the present disclosure.

FIG. 6 illustrates a state diagram that describes the behavior of one example of the MST illustrated in FIGS. 3 and 4. Though the state diagram of FIG. 6 is for an MST including micro-size $TaO_x$ memristor devices, other size memristors (such as, for example, nano-scale memristors) and memristors made from other materials may exhibit the behavior illustrated, at the same voltages illustrated in the state diagram, or at different voltages.

At state 102, both memristors 14 and 18 are off. Signals 112, 114, 115, 116, and 118 illustrate state changes from state 102 when voltages of different polarity and of different magnitude are applied. Signal 112 is a positive voltage that is greater than or equal to 1.7 V. Signal 112 changes the system to state 106, where memristor 14 turns on and memristor 18 turns on. Signal 114 is a positive voltage greater than or equal to 1.1 V and less than 1.7 V. Signal 114 changes the system to state 104, where memristor 14 turns on and memristor 18 is unchanged. Signal 115 is a positive voltage less than 1.1 V. Signal 115 changes the system to state 108, where memristor 14 is off and memristor 18 is unchanged. Signal 116 is a negative voltage less than 2.8 V. Signal 116 also changes the system to state 108. Signal 118 is a negative voltage less than or equal to 2.5 V. Signal 118 does not change the state of the system from state 102.

At state 104, memristor 14 is on and memristor 18 is unchanged. Signals 121, 122, 123, 124, and 125 illustrate state changes from state 104 when voltages of different polarity and of different magnitude are applied. Signal 121 is a negative voltage that is less than 1.1 V. Signal 122 is a positive voltage less than 1.1 V. Signals 121 and 122 do not change the state of the system from state 104. Signal 123 is a negative voltage greater than or equal to 1.1 V and less than 1.6 V. Signal 123 changes the system to state 108, where memristor 14 turns off and memristor 18 is unchanged. Signal 124 is a negative voltage greater than or equal to 1.6 V. Signal 124 changes the system to state 102, where memristors 14 and 18 turn off. Signal 125 is a positive voltage greater than or equal to 1.3 V. Signal 125 changes the system to state 106, where memristors 14 and 18 both turn on.

At state 106, memristors 14 and 18 are both on. Signals 131, 132, 133, 134, and 135 illustrate state changes from state 106 when voltages of different polarity and of different magnitude are applied. Signal 131 is a positive voltage that is less than 1.1 V. Signal 132 is a negative voltage less than 1.1 V. Signals 131 and 132 change the state of the system to state 104, where memristor 14 is on and memristor 18 is unchanged. Signal 133 is a positive voltage greater than or equal to 1.3 V. Signal 133 does not change the state of the system from state 106. Signal 134 is a negative voltage greater than or equal to 1.6 V. Signal 134 changes the system to state 102, where memristors 14 and 18 turn off. Signal 135 is a negative voltage greater than or equal to 1.1 V and less than 1.6 V. Signal 135 changes the system to state 108, where memristor 14 turns off and memristor 18 is unchanged.

At state 108, memristor 14 is off and memristor 18 is unchanged. Signals 141, 142, 143, 144, and 145 illustrate state changes from state 108 when voltages of different polarity and of different magnitude are applied. Signal 141 is a positive voltage greater than or equal to 1.1 V and less than 1.7 V. Signal 141 changes the state to state 104, where memristor 14 is on and memristor 18 is unchanged. Signal 142 is a positive voltage greater than or equal to 1.7 V. Signal 142 changes the state to state 106, where both memristors 14 and 18 turn on. Signal 143 is a positive voltage less than 1.1 V. Signal 144 is a negative voltage less than 1.1 V. Signals 143 and 144 do not change the state. Signal 145 is a negative voltage greater than or equal to 2.5 V. Signal 145 changes the system to state 102, where memristors 14 and 18 both turn off.

As illustrated in the state machine illustrated in FIG. 6, memristor 14 (and therefore resistance switch 12) acts as a switch. Memristor 18 (and therefore resistance switch 10) weights the switching behavior of memristor 14 by weighting the signal. The structure therefore includes both temporal (switching behavior of memristor 14) and spatial (weighting behavior of memristor 18) behavior.

The state machine of FIG. 6 summarizes the state transition diagram of the MST by varying SET/RESET pulses (i.e., positive and negative voltages) at different voltage amplitudes. Considering that the temporal component memristor 14 is either ON or OFF while the spatial component memristor 18 could be unchanged, turning to ON, or turning to OFF, the MST could have six possible transition states. However, based on the analysis in FIG. 5, the situations of "memristor 14 ON and memristor 18 is tuning to OFF" and "memristor 14 OFF & memristor 18 is turning to ON" can never occur in MST synapse operation and hence are excluded. Memristor 18's tuning rate is not a constant value but determined by the present temporal state and spatial weight of the MST as well as the applied voltage.

Figure 7:
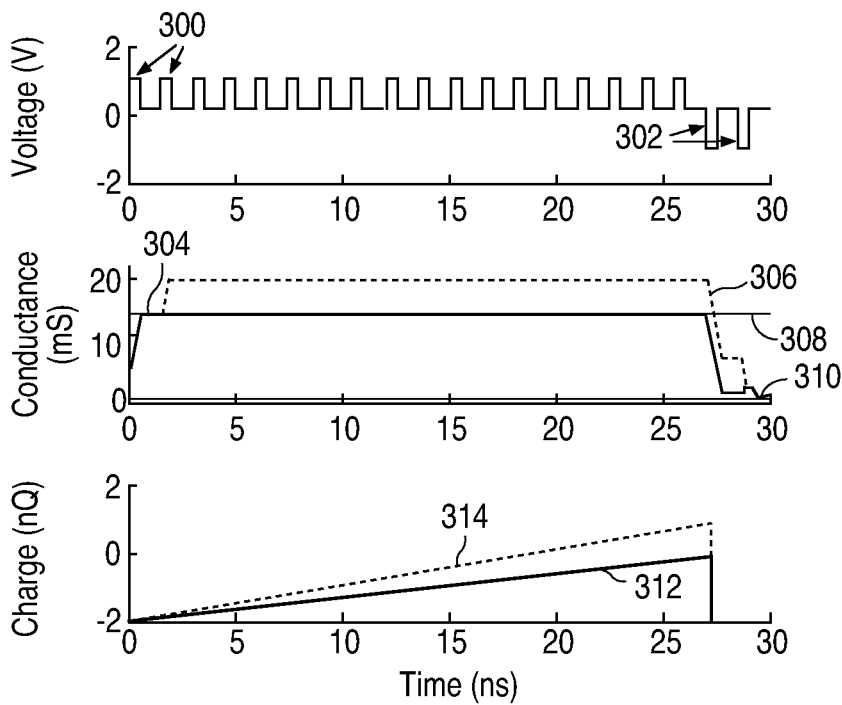
FIG. 7 illustrates voltage, conductance, and charge as a function of time for the MST illustrated in FIGS. 3 and 4, in the case where the input neuron fires much faster than the output neuron, according to examples of the present disclosure.
Figure 8:
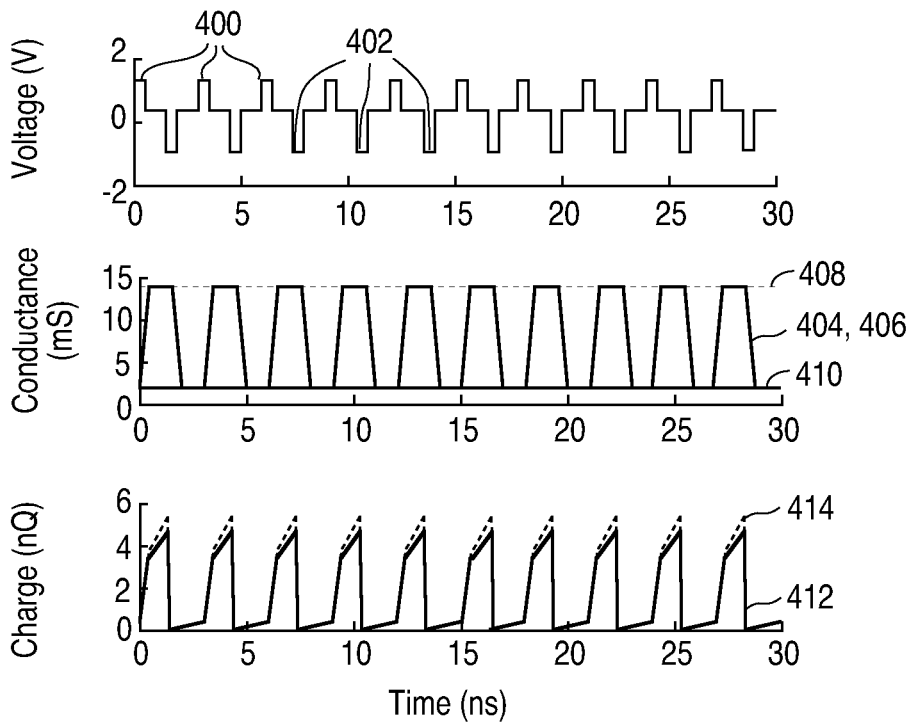
FIG. 8 illustrates voltage, conductance, and charge as a function of time for the MST illustrated in FIGS. 3 and 4, in the case where the input neuron and the output neuron are strongly correlated, such that their firing events alternate, according to examples of the present disclosure.
Figure 9:
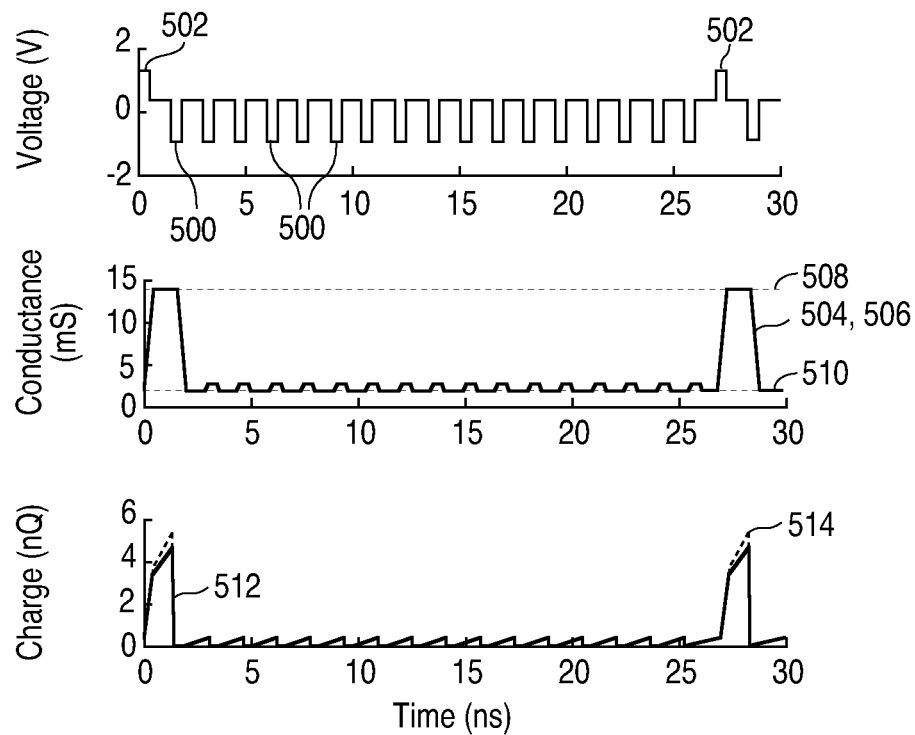
FIG. 9 illustrates voltage, conductance, and charge as a function of time for the MST illustrated in FIGS. 3 and 4, in the case where the output neuron fires more quickly and more frequently than the input neuron, according to examples of the present disclosure.

FIGS. 7, 8, and 9 illustrate spike-timing-based recall behavior in the MST illustrated in FIGS. 3 and 4, according to examples of the present disclosure. In spike-timing-based recall, memristor 14 switches temporally. For instance, as illustrated in FIG. 7 and described below, a pre-spike initializes a positive SET pulse through the MST, activating the MST. A post-spike results in a negative RESET pulse, which eventually deactivates the MST. The spatial component memristor 18, however, remains at its initial value during the entire procedure. The spatial weighting function is reflected by the overall volume of charge through the MST. To monitor the change of synaptic weight in recall, a low DC signal of 0.2V is applied in the simulations illustrated in FIGS. 7, 8, and 9.

There are three types of typical timing situations in spike-timing-based recall, which are illustrated in FIGS. 7, 8, and 9.

FIGS. 7, 8, and 9 illustrate the properties of the MST of FIGS. 3 and 4 including the spike-timing-based recall ability and synaptic weight tunability of the MST for three different cases. Each of FIGS. 7, 8, and 9 illustrates three curves: the top curve illustrates input voltage as a function of time, the middle curve illustrates conductance of the MST as a function of time, and the bottom curve illustrates charge in the MST as a function of time.

FIG. 7 illustrates the case where the input neuron 200 fires much faster than the output neuron 202, forming a multi-spike train with many SET pulses 300 (i.e. positive voltage pulses, or pulses from the input neuron 200) and fewer RESET pulses 302 (i.e. negative voltage pulses, or pulses from the output neuron 202). The MST behavior under such excitations is shown in FIG. 7. Curve 304 illustrates the conductance of memristor 14 and curve 310 illustrates the conductance of memristor 18, when memristor 18 is initially OFF. Curve 306 illustrates the conductance of memristor 14 and curve 308 illustrates the conductance of memristor 18, when memristor 18 is initially ON. Curve 312 illustrates the charge through the MST when memristor 18 is initially OFF. Curve 314 illustrates the charge through the MST when memristor 18 is initially ON.

Memristor 14 turns ON at the first SET pulse and remains ON until a RESET pulse comes, as illustrated by curve 304. In some examples, the conductance of memristor 14 could increase further if two SET pulses fire in consequence, as illustrated by curve 306. Memristor 14 can still be switched OFF from an increased conductance state by extending the duration or number of the RESET pulses, as illustrated by curve 306. During the whole recall process, the value of memristor 18 remains constant, as illustrated by curves 308 and 310, and determines the total charge through the MST, as illustrated by curves 312, and 314. More specific, the charge accumulation is faster when memristor 18 is $R_{ON}$ but much slower if memristor 18 is $R_{OFF}$.

FIG. 8 illustrates the case where the input neuron 200 and the output neuron 202 are strongly correlated, such that their firing events alternate and appear as a sequence of SET 400/RESET 402 pulses through the MST. Curve 404 illustrates the conductance of memristor 14 and curve 410 illustrates the conductance of memristor 18, when memristor 18 is initially OFF. Curve 406 illustrates the conductance of memristor 14 and curve 408 illustrates the conductance of memristor 18, when memristor 18 is initially ON. Curve 412 illustrates the charge through the MST when memristor 18 is initially OFF. Curve 414 illustrates the charge through the MST when memristor 18 is initially ON.

As shown in FIG. 8, in this circumstance, memristor 14 (and the MST) switches between ON and OFF states but memristor 18 is not affected, as illustrated by curves 404, 406, 408, and 410. The charge accumulation through the MST is at a low rate when the MST is OFF but increases significantly once the MST turns on, as illustrated by curves 412 and 414.

FIG. 9 illustrates the case where the output neuron 202 fires more quickly and more frequently than the input neuron 200, which is the opposite situation of the case illustrated in FIG. 7. The spike-train through the MST is therefore in a form of many RESET pulses 500 and a few SET pulses 502, as illustrated by the top curve of FIG. 9. Curve 504 illustrates the conductance of memristor 14 and curve 510 illustrates the conductance of memristor 18, when memristor 18 is initially OFF. Curve 506 illustrates the conductance of memristor 14 and curve 508 illustrates the conductance of memristor 18, when memristor 18 is initially ON. Curve 512 illustrates the charge through the MST when memristor 18 is initially OFF. Curve 514 illustrates the charge through the MST when memristor 18 is initially ON.

During the sequence of RESET pulses, the MST is OFF and thus not much charge can pass through it, as illustrated by curves 512 and 514. Memristor 14 can be re-activated by any SET pulse, as illustrated by curves 504 and 506. Memristor 18 stays at its initial value without any change, as illustrated by curves 508 and 510.

Figure 10:
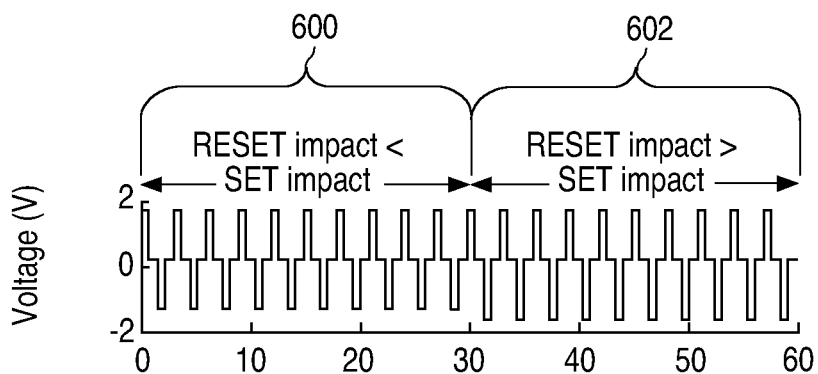
FIG. 10 illustrates the tunability of the MST of FIGS. 3 and 4, according to examples of the present disclosure.
Figure 10:
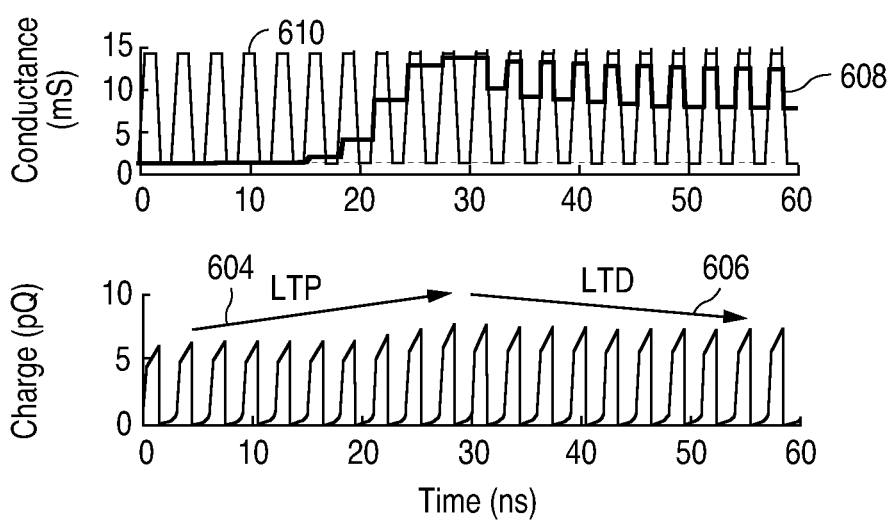

FIG. 10 illustrates the weight tunability of the MST illustrated in FIGS. 3 and 4, according to examples of the present disclosure. Tuning targets only the spatial weight of memristor 18, not memristor 14, which represents the activation status of the MST.

The top curve of FIG. 10 illustrates voltage as a function of time, the middle curve of FIG. 10 illustrates conductance of the MST as a function of time, and the bottom curve of FIG. 10 illustrates charge through the MST as a function of time. Curve 608 illustrates conductance of memristor 18. Curve 606 illustrates conductance of memristor 14.

The pre- and post-neurons 200 and 202 fire alternately, appearing as a sequence of SET/RESET pulses through the MST.

In the first 10 cycles, illustrated by portion 600, the spikes generated at the pre-neuron 200 are stronger. As a result, memristor 18 gradually shifts toward ON state with better conductivity, as illustrated by curves 604 and 608, which demonstrates the long term potentiation (LTP) behavior of the MST: a long lasting strength potentiation once the MST receives strong and positive stimulus from active connections.

In the next 10 cycles, illustrated by portion 602, the spikes generated at the post-neuron 202 are stronger. The effective conductance of memristor 18 when the MST turns ON gradually reduces, which demonstrates long term depression (LTD), the opposite of LTP. The change of MST synaptic strength (conductance) is reflected by the charge passed through the synapse, as shown in the bottom curve of FIG. 10.

In summary, the positive stimuli corresponding to stronger-SET:weaker-RESET combination enables LTP. The negative stimuli corresponding to weaker-SET:stronger-RESET pulses enables LTD.

Memristor 14 takes majority of the pulse voltage and hence can reach ON or OFF state all the times, as illustrated by curve 610. The conductance of memristor 14 slowly changes because only a small amount of voltage applies on it.

Figure 11:
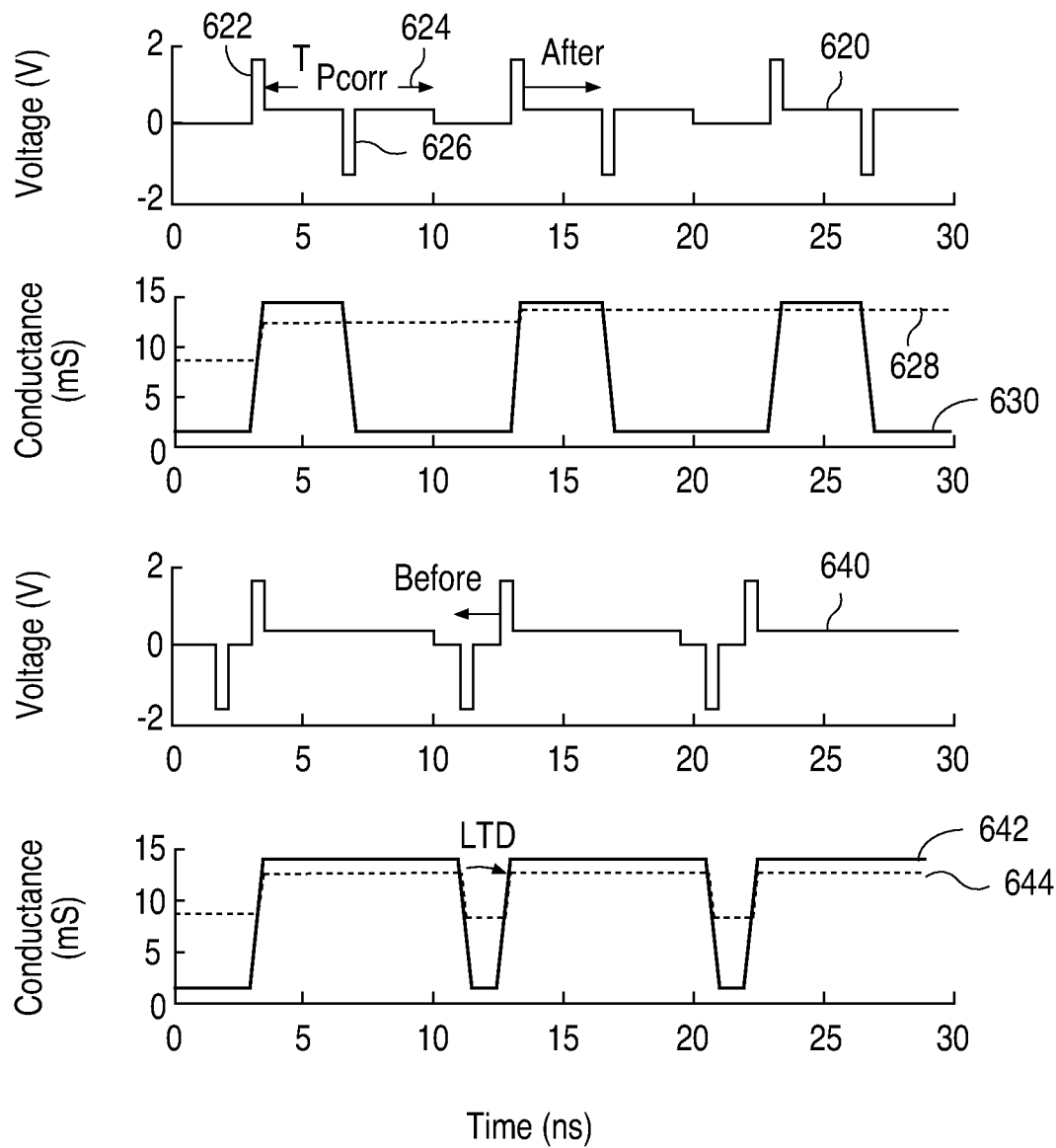
FIG. 11 illustrates spike-time-dependent plasticity (STDP) learning in the MST of FIGS. 3 and 4, according to examples of the present disclosure.

FIG. 11 illustrates spike-timing-dependent plasticity (STDP) in the MST of FIGS. 3 and 4, according to examples of the present disclosure. STDP is a property of biological synapses. If a pre-spike (SET pulse) fires before a post-spike (RESET pulse) within a correlation time window, the synaptic strength of the MST in between is potentiated, corresponding to LTP behavior. Similarly, if a pre-spike fires after a post-spike within the correlation time window, the synaptic strength of the MST in between is depressed, corresponding to LTD behavior.

A spike pulse is followed by a small DC signal of 0.4V, lasting for $T_{Pcorr}$, representing the positive correlation time window of the spike. The negative correlation time window $T_{Ncorr}$ can be formed by setting a normal RESET pulse $T_{Pcorr}$–$T_{Ncorr}$ ahead of the target spike. In this way, synapses for uncorrelated input spikes are pre-deactivated and will not be affected. Since a natural $T_{Ncorr}$ has been naturally defined by the time between previous target spike and the current input spike in the design, a separate setting of $T_{Ncorr}$ can be saved.

Curve 620, which illustrates voltage as a function of time, illustrates the scenario where the input pulse 622 injects first and the corresponding output pulse 626 falls within $T_{Pcorr}$ 624 of the input pulse. Curve 630 illustrates conductance of memristor 14 as a function of time. Curve 628 illustrates conductance of memristor 18 as a function of time. Though the strong SET pulse remains unchanged, the small DC signal associated with the input pulse degrades the strong RESET pulse to a normal RESET. Such a condition makes the conductance of memristor 18 increase, as illustrated by curve 628, resulting in a LTP process.

Curve 640, which illustrates voltage as a function of time, illustrates the scenario where RESET pulses remain strong and have larger impact than the SET pulses, resulting in a LTD process, as illustrated by curves 642 and 644, which illustrate the conductance through memristor 14 and memristor 18, respectively, as a function of time.

Figure 12:
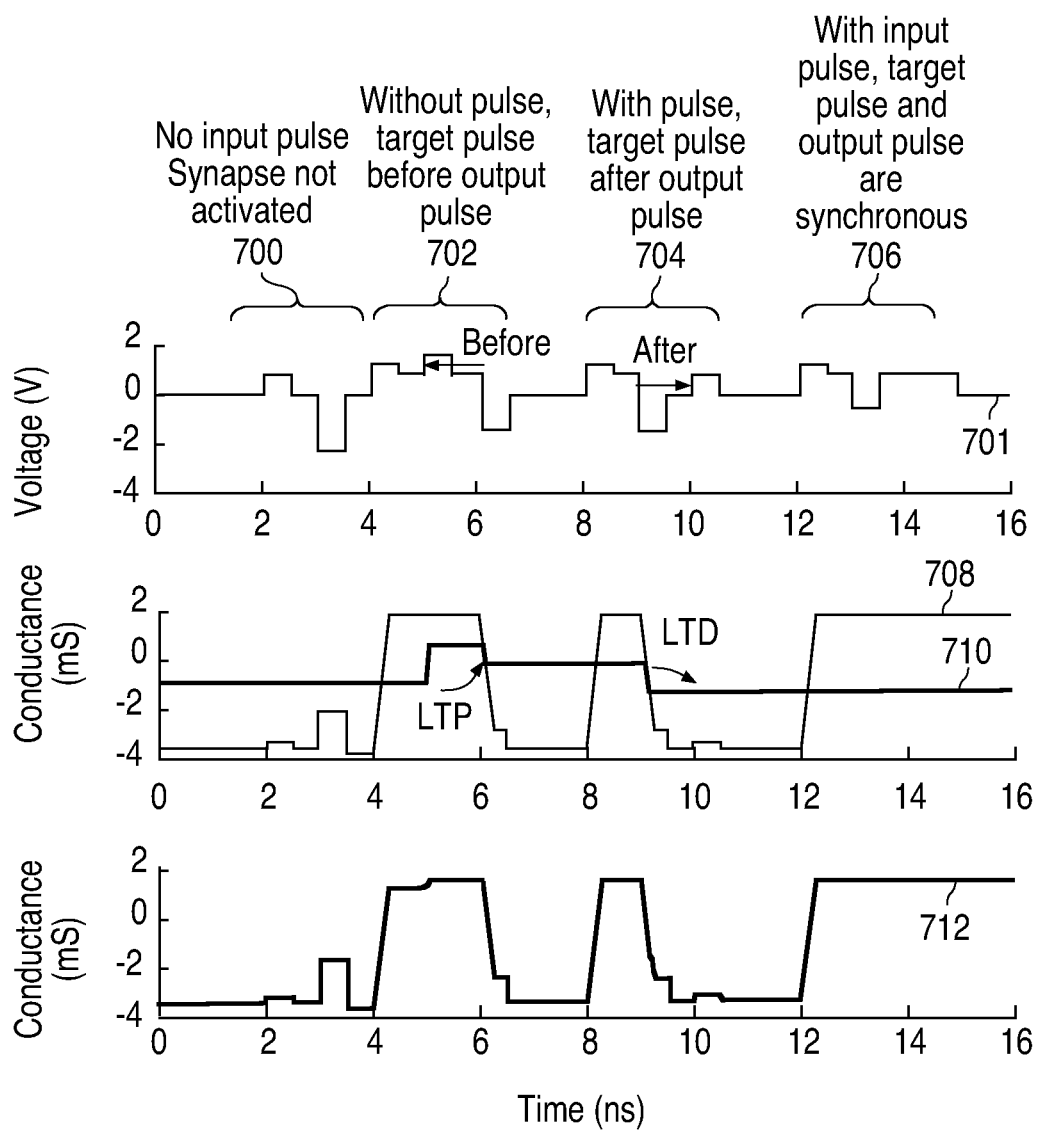
FIG. 12 illustrates ReSuMe learning in the MST of FIGS. 3 and 4, according to examples of the present disclosure.

FIG. 12 illustrates ReSuMe learning behavior in the MST of FIGS. 3 and 4, according to examples of the present disclosure. ReSuMe has better learning quality than STDP since it considers output signals as feedback signals and may minimize error between target signal and output signal.

Similar to STDP learning as illustrated in FIG. 11, a small DC signal with a period of $T_{corr}$ following a spike is used to represent its correlation time window. However, based on the requirement of ReSuMe, the DC signal shall terminate right away when its correlated counterpart fires a spike.

The top curve 701 of FIG. 12 illustrates voltage as a function of time. The bottom two curves illustrate conductance as a function of time, for the MST (curve 712), memristor 14 (curve 708), and memristor 18 (curve 710). Four typical situations are illustrated. In situation 700, there is no input pulse. Since the target pulse is lower than SET threshold, the MST remains at OFF state, as illustrated by curve 712. Neither the target pulse nor the output pulse can change the synaptic conductance.

In situation 702, the target pulse happens before the output pulse, and both of them fall into the correlation window of the input pulse. As such, the output pulse performs as a normal RESET and causes LTP, as illustrated by curve 710, which is the conductance of memristor 18.

In situation 704, the output pulse happens before the target pulse. The output pulse makes memristor 18 shift toward OFF state, implying a LTD process, as illustrated by curve 710. Under this situation, the target pattern does not contribute to the learning process because it cannot SET the device alone while the DC signal has already been terminated.

In situation 706, the target and output pulses are approximately synchronized. There is no update on memristor 18, the MST stays ON as illustrated by curve 712, and the DC signal applies. Perfect matching of the target and output pulses is not required, because memristor state change requires SET/RESET pulse last for sufficient time.

FIG. 13 illustrates in more detail an alternative example of a cell or MST as illustrated in FIG. 2. In the structure illustrated in FIG. 13, the first resistance switch 10 is a single memristor 32. The second resistance switch 12 is a single memristor 34. In order for the first and second resistance switches 10 and 12 to have different switching characteristics, the memristors 32 and 34 may be different devices, such that they have different switching characteristics, such as different switching voltages, or different switching current thresholds. Memristors with different switching characteristics may be formed by forming memristors 14 and 18 from different materials, of different sizes, and/or according to different fabrication processes (annealing or not, for example).

FIG. 14 illustrates an alternative example of a circuit according to FIG. 2 in more detail. In the structure illustrated in FIG. 14, the first resistance switch 10 is a memristor 36 connected in parallel with a resistor 40. The second resistance switch 12 is a memristor 38 connected in parallel with a resistor 42. The memristors 36 and 38 may be identical devices, though they need not be. In order for the first and second resistance switches 10 and 12 to have different switching characteristics, if the memristors 36 and 38 are identical devices, resistors 40 and 42 must be different devices. If resistors 40 and 42 are identical devices, in order for the first and second resistance switches 10 and 12 to have different switching characteristics, memristors 36 and 38 must be different devices.

The structure illustrated in FIG. 4 and the circuits illustrated in FIGS. 1, 2, 3, 13, and 14 may be part of larger circuits or systems.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A device comprising:
    a crossbar array comprising a plurality of memristor-based spatio-temporal (MST) synapses, wherein a respective MST synapse provides spatial and temporal weighting functions, and wherein the MST synapse comprises:
        a first resistance switch comprising a first memristor connected in parallel with a resistor; and
        a second resistance switch comprising a second memristor and connected in series with the first resistance switch;
        wherein the first and second resistance switches have different switching voltages to switch between on and off states.

2. The device of claim 1 wherein the first and second memristors have same on-and-off resistance states.

3. The device of claim 1 wherein:
    the resistor is a first resistor; and
    the second resistance switch comprises a second resistor connected in parallel with the second memristor.

4. The device of claim 1 wherein:
    the first resistance switch comprises a first memristor;
    the second resistance switch comprises a second memristor; and
    the first and second memristors have different on-and-off resistance states.

5. The device of claim 1 wherein:
    one of the first resistance switch and the second resistance switch provides a temporal weighting function of the MST synapse; and
    the other of the first resistance switch and the second resistance switch provides a spatial weighting function of the MST synapse.

6. A memristor-based spatio-temporal (MST) synapse that provides spatial and temporal weighting functions, the MST synapse comprising:
    a first switch comprising a first memristor connected in parallel with a resistor; and
    a second switch comprising a second memristor;
    wherein the first switch is connected in series with the second switch.

7. The MST synapse of claim 6, wherein the first and second switches have different switching voltages to switch between on and off states.

8. The MST synapse of claim 6, wherein the MST synapse comprises a multilayer structure, wherein the first memristor and the resistor are positioned side by side between a first conducting layer and a second conducting layer, and wherein the second memristor is positioned between the second conducting layer and a third conducting layer.

9. The MST synapse of claim 8, wherein the first memristor comprises an oxide of tantalum.

10. The MST synapse of claim 8, wherein the resistor comprises one or more of: polysilicon, TaAl, and TaSiW.

11. A device comprising:
   a crossbar array comprising a plurality of memristor-based spatio-temporal (MST) synapses, wherein a respective MST synapse provides spatial and temporal weighting functions, and wherein the MST synapse comprises:
      a first resistance switch comprising a first memristor; and
      a second resistance switch comprising a second memristor connected in series with the first resistance switch;
      wherein the first and second resistance switches have different switching voltages to switch between on and off states,
      wherein the first and second memristors have different on-and-off resistance states.

* * * * *